United States Patent
Howitt et al.

(10) Patent No.: US 7,231,403 B1
(45) Date of Patent: Jun. 12, 2007

(54) SYSTEM AND METHOD FOR TRANSFORMATION AND ANALYSIS OF MESSAGING DATA

(75) Inventors: Mathew A. Howitt, Austin, TX (US); Jocelyn E. Goldfein, San Carlos, CA (US); Michael N. Nonemacher, Austin, TX (US)

(73) Assignee: MessageOne, Inc., Austin, TX (US)

( * ) Notice: Subject to any disclaimer, the term of this patent is extended or adjusted under 35 U.S.C. 154(b) by 553 days.

(21) Appl. No.: 10/295,427

(22) Filed: Nov. 15, 2002

(51) Int. Cl.
*G06F 17/00* (2006.01)
*G06F 15/16* (2006.01)
*H04M 1/24* (2006.01)

(52) U.S. Cl. .................. 707/104.1; 709/201; 379/1.03

(58) Field of Classification Search ............. 707/104.1; 709/201, 206, 207, 223, 224; 714/47, 912; 379/1.03
See application file for complete search history.

(56) References Cited

U.S. PATENT DOCUMENTS

| | | | |
|---|---|---|---|
| 5,986,653 A | 11/1999 | Phathayakorn et al. | |
| 6,078,324 A | 6/2000 | Phathayakorn et al. | |
| 6,253,211 B1* | 6/2001 | Gillies et al. | 707/201 |
| 6,397,359 B1 | 5/2002 | Chandra et al. | |
| 6,408,335 B1 | 6/2002 | Schwaller et al. | |
| 6,754,470 B2* | 6/2004 | Hendrickson et al. | 455/67.11 |
| 7,024,474 B2* | 4/2006 | Clubb et al. | 709/223 |
| 2003/0020749 A1* | 1/2003 | Abu-Hakima et al. | 345/752 |
| 2003/0055951 A1* | 3/2003 | Chemali | 709/224 |
| 2004/0059789 A1* | 3/2004 | Shum | 709/206 |

* cited by examiner

*Primary Examiner*—Uyen Le
(74) *Attorney, Agent, or Firm*—Fulbright & Jaworski LLP

(57) ABSTRACT

Systems and methods which provide translation and/or transformation of messaging data, such as that collected by a distributed management method, for collection, consolidation, processing, and/or analysis are shown. Preferred embodiments of the present invention provide data translation schema to manipulate raw data stored in a first database or databases, such as a staging database, to store useful information in appropriate locations of a second database or databases, such as a data warehouse. Preferably, for each data source monitored in a messaging environment, collected raw messaging data is parsed into appropriate positions of a staging database. Thereafter, data transforms of the present invention preferably manipulate and/or process data of the staging database and provide useful information for storage in a data warehouse.

53 Claims, 3 Drawing Sheets

SYSTEM AND METHOD FOR TRANSFORMATION AND ANALYSIS OF MESSAGING DATA

REFERENCE TO RELATED APPLICATIONS

The present application is related to concurrently filed, co-pending, and commonly assigned U.S. patent application Ser. No. 10/295,252, entitled "System and Method for the Management of Messaging Systems," the disclosure of which is hereby incorporated herein in its entirety.

TECHNICAL FIELD OF THE INVENTION

The invention relates generally to messaging systems and, more particularly, to collection, consolidation, processing, and/or analysis of messaging data.

BACKGROUND OF THE INVENTION

Messaging systems are in wide use for maintaining communication between people, such as employees of a business entity and/or clients and vendors thereof. For example, messaging systems, in which a server or number of servers are deployed, coupled to information communication links, and typically having operator terminals coupled thereto, are in widespread use by business entities of all sizes. Such messaging systems may comprise electronic mail servers, as may operate upon one or more vendor platforms such as MICROSOFT EXCHANGE, NOVELL GROUPWISE, LOTUS NOTES, etcetera, coupled to various networks, such as local area networks (LANs), metropolitan area networks (MANs), wide area networks (WANs), intranets, the Internet, the public switched telephone network (PSTN), wireless networks, cable transmission systems, and/or the like, to facilitate information communication between other systems, servers, and/or access terminals. Additionally or alternatively, such messaging systems may comprise telephony systems, such as voice mail systems (VMSs), automated voice response (AVR) units, etcetera, coupled to one or more of the above mentioned networks to facilitate information communication between other systems, servers, and/or operator terminals.

Such messaging systems may comprise a relatively simple configuration, such as a single server system or relatively few servers (e.g. on the order of 10 servers disposed at a same physical location), providing messaging services for a few users (e.g. on the order of tens or hundreds of users). Alternatively, messaging systems may comprise a relatively complex configuration, such as many servers (e.g. on the order of 100 servers disposed throughout a city, state, region, country, or even the world) providing messaging services for a large number of users (e.g. on the order of thousands, tens of thousands, or even hundreds of thousands of users). Of course, such messaging systems may comprise any level of complexity between the aforementioned relatively simple and relatively complex configurations.

Providing management of messaging systems may present a number of problems, both technological and business related. For example, an agent-based model has been employed in the past, wherein software (an agent) is run on many or each server of the messaging system to collect data from each of these servers and transmit that data to a central system, when it has been attempted to collect data for management of a messaging system. In such a solution agents must be installed to each such server and properly configured for the corresponding server configuration. Thereafter, the agents must be individually maintained, such as to be upgraded to correspond to a server software upgrade, to be reconfigured to alter the type of data collected and/or how the data is reported, and the like. In a smaller environment, such as where 10 servers are deployed at a same location, installation and management of such agents may be feasible.

However, in an environment with hundreds of servers, such as may be deployed at a business entity's locations throughout the globe, installing and managing such agents becomes less feasible, and quite nearly impossible. For example, each of the hundreds of agents running on the hundreds of servers must typically each be kept up to date running the latest software, so as a vendor releases a new software agent it must be installed on the corresponding servers. This not only requires the time to install the agent software on each of the geographically diverse servers, but also the time to configure and confirm proper operation of the new agents.

Moreover, there is a natural aversion by information technology personnel and/or information technology companies to installing anything from any vendor on their production systems. In order to increase system stability, reliability, performance, predictability, etcetera, information technology professionals typically strive to keep important information technology systems as clean as possible. Accordingly, there is a reluctance to introducing such agents to the servers, or other systems, of the aforementioned messaging systems, in addition to the above mentioned logistical issues with respect to installation and maintenance of these components.

Even where one has acquiesced to the above disadvantages associated with the deployment of agents at the servers of a complex messaging system, further challenges are associated with their use in management data collection. Complex messaging systems are often characterized by having a large number of servers that are geographically distributed, such as throughout the world, and connected by a variety of network links which are often relatively low bandwidth and/or providing somewhat intermittent or unreliable links. Accordingly, a problem with respect to managing or collecting data from such a system is that, wherever a management system is disposed to try and collect data from the agents, the management system is completely at the whim of the network links and the relatively limited functionality of the agents. For example, data from such agents may be lost and/or the agents cease to function properly when links with a management system collecting the data fail. Moreover, in such a complex messaging system the management system in such an agent implementation typically must pull from many servers, increasing the complexity of the management system itself and/or degrading the performance thereof.

It should be appreciated that, in such a complex messaging environment, all the servers or other sources of management data are unlikely to be configured similarly and/or provide homogeneous functionality. For example, messaging system servers may be running different messaging software, perhaps from different vendors and/or operating upon disparate processor platforms or operating systems. It is not uncommon to encounter a messaging environment which includes a MICROSOFT product, such as EXCHANGE, to provide a mail server while a RESEARCH IN MOTION (RIM) product provides a wireless interface and/or another vendor's product provides anti-virus functionality, any or all of which may be operable upon various servers of a messaging environment. The way in which data is collected, the type and format of raw data collected, timing with respect to the availability of data, etcetera may be affected by these messaging environment server configuration aspects. Accordingly, in addition to providing the appropriate agents capable of collecting desired data being difficult, providing a management system capable of accommodating the variety of raw data provided and the various ways in which it is likely to be presented is itself difficult.

Additionally, the volume of raw data provided by agents, and therefore collected by a management system, in such an implementation is problematic. For example, the rate at which raw data is provided to a management system by such agents and the volume of raw data which must be processed, stored, and managed in association with a complex messaging system is great. According to a typical agent/management system implementation the personnel managing this collected data must create processes to backup the data, purge the data, consolidate or roll up the data, turn the raw data into useful information and do this on an ongoing basis and in a manner which accommodates the rate at which data is collected and the volume of data collected.

Historically, even where the above described agent/management system has been implemented, it is very difficult for large companies or other entities using relatively complex messaging systems to get a unified view across their entire environment, such as may include a number of servers, a number of geographic locations, and/or a number of vendor's products. For example, there has been no effective way to distill the large amount of data from disparate servers into a unified view of the messaging system. Moreover, there typically has not been the processing infrastructure and number of skilled personnel devoted to the task of massaging collected raw data into a unified view of the messaging system. However, such a unified view of a messaging system may be helpful in order to compare metrics in one region to another, to do balancing, or to do company-wide capacity planning. For example, although mail administrators may be satisfied with a fragmented view of the messaging system, providing information with respect to servers in their charge, at a higher administration level, such as at the level of a CIO of an organization, the issues and concerns are more global with respect to the entity's messaging system.

Moreover, it may be desirable at a high level administration level to have information with respect to the operation of the messaging system as compared to industry-wide norms or other external or internal benchmarking comparisons. However, there is nothing in place today which will give such comparative information.

BRIEF SUMMARY OF THE INVENTION

The present invention is directed to systems and methods which provide translation/transformation of messaging data, such as that collected by a distributed management system, for collection, consolidation, processing, and/or analysis. Preferred embodiments of the present invention provide data translation schema to manipulate raw data stored in a first database or databases, such as a staging database, to store useful information in appropriate locations of a second database or databases, such as a data warehouse. For example, for each data source monitored in a messaging environment, collected raw messaging data may be parsed into appropriate positions of a staging database. Thereafter, data transforms of the present invention may manipulate and/or process data of the staging database, perhaps using other sources of data as well, and provide useful information for storage in a data warehouse.

Transforms of the present invention preferably accommodate various sources of data, different formats of data, data reported with different frequencies, etcetera and provide manipulation thereof in order to facilitate a unified view of a message environment. Moreover, transforms of the present invention preferably accommodate messaging data collected from messaging systems of a plurality of entities and provide manipulation thereof in order to facilitate comparisons across messaging environments.

Messaging system data collected according to the present invention may include performance counters, such as specific values measured by a server, specific metrics from servers, such as operational aspects of a server, message logs, such as logs of message traffic stored upon a server, archives of the messages themselves that are sent or received by the servers, such as may include information with respect to the context of the messages etcetera, directory information, such as what servers are operable within the messaging system and what users are on what servers, and/or the like.

There are two primary components of a preferred embodiment distributed management system of the present invention. Accordingly, preferred embodiments of the present invention include a first component, referred to herein as a collection system or data collector, and a second component, referred to herein as an aggregation system or management server system. Collection systems of the present invention are preferably deployed near a messaging system network edge, such as behind the firewalls of regional messaging portions of a messaging environment utilizing public networks to interconnect portions of the messaging environment. A management server of the present invention is preferably deployed at a centralized location, such as a service provider's facility and/or an information technology office of the entity for which messaging is being analyzed.

A preferred embodiment data collection system of the present invention may be provided on a computer system platform operable under control of an instruction set defining operation as set forth herein and providing interfacing with messaging systems to be managed and a centralized management server of the present invention. A plurality of such data collection systems may be deployed throughout an entity's messaging environment to collect data from the messaging servers and/or other systems thereof. The preferred embodiment data collection systems communicate collected data to the aforementioned management server of the present invention. Data as provided to a management server by a data collection system of the present invention may be in an unprocessed state, i.e., "raw" data as collected from the messaging environment systems, or may be filtered or processed by the data collection system, such as to aggregate or partially aggregate data, parse data, format or reformat data, etcetera.

A preferred embodiment management server of the present invention may be provided on a computer system platform or platforms operable under control of an instruction set defining operation as set forth herein and providing interfacing with data collection systems of the present invention. Additionally, management servers of the present invention preferably include interfaces for presenting management information, such as providing reports with respect to managed messaging systems and providing status, condition, and alarm notices and/or warnings, such as to managers and operators. Preferred embodiment management servers provide processing of data provided by the data collection systems to aggregate, consolidate, and roll up the data and to otherwise turn the collected data into useful information for management of the messaging environment.

Additionally, preferred embodiment management servers provide data warehousing, backup and purging of the data, etcetera to accommodate a large volume of collected data in an organized way.

In addition to accepting data communicated from data collection systems of the present invention, preferred embodiment management servers provide for communication of information to data collection systems. For example, as the messaging environment being managed is modified, such as through the introduction of new or updated messaging software, management servers of the present invention may provide information, such as configuration information and/or data collection software, to appropriate ones of the data collection systems. Additionally or alternatively, management servers of the present invention may operate to control data collection systems of the present invention to instruct various messaging systems to alter their operation, such as based upon an analysis of collected data and/or under the control of management personnel.

Management servers of the present invention are, according to a preferred embodiment, disposed external to the messaging environment being managed. For example, public and/or private network links, such as the Internet or leased lines of a PSTN, may be utilized to place data collection systems, preferably disposed within the messaging environment being managed, in communication with a management server. Such an embodiment facilitates a model in which a service provider may assume management responsibilities with respect to an entity's messaging systems. It should be appreciated that management of a relatively large messaging environment, such as may comprise a large number of messaging servers of various types and from a variety of vendors deployed throughout a large geographic area, is very complicated, particularly as time progresses to result in large databases having large sets of historical information about the messaging environment, thereby making the service provider model a desirable solution in both reducing the complexity of the task from the entity for which messaging environment monitoring is provided as well as reducing the entity's personnel required to operate and maintain such a messaging environment.

Although described herein as a management server, it should be appreciated that management servers of the present invention may comprise a number of systems. For example, a preferred embodiment management sever includes a collection or aggregation system, preferably having a database associated therewith, and a reporting system, also preferably having a database associated therewith. Moreover, each such system may, themselves, comprise multiple systems, such as to provide a load distributed "farm" of servers. Such an embodiment provides advantages in that at least a portion of management data traffic may be removed from the messaging environment to thereby lessen the impact of such a system upon the operation of the messaging system.

A further advantage of the preferred embodiment distributed management system is that extensibility is readily provided for. Specifically, new types of data sources, as well as changes in data sources, may be accommodated for the collection of data without having a large impact upon messaging system. According to the present invention gathering of data from large messaging environments, perhaps spread over a large geographic area, is facilitated through the use of a plurality of data collection systems deployed to partition the entity's messaging environment, and therefore its associated problems, into a plurality of smaller pieces. A centralized management server may then collect and aggregate the environment wide data for analysis, reporting, control, storage, etcetera. The overall reliability of the series of smaller message environment portions, with respect to data collection and transmission, is increased as no single network link or message environment system is relied upon to provide for the collection and/or transmission of data. Moreover, the data collector systems of the present invention allow for robust data collection and transmission features, such as retry until successful, self re-initialization, data aggregation, etcetera, generally not possible with an agent model.

Preferred embodiment data collection systems of the present invention implement "probes" in order to accommodate future growth in the messaging environment, such as the introduction of new messaging software, new messaging hardware, revisions of existing messaging software, and/or revisions of existing messaging hardware. The probes of the present invention are preferably software modules developed for collecting, aggregating, and/or transmitting data from particular data sources, such as particular ones of the aforementioned messaging software and/or hardware. Preferred embodiment probes are operable on a substantially generic data collection platform, which is preferably deployed in a messaging environment, and collect the data from various messaging systems without requiring the installation of any management software of the present invention on the messaging systems being monitored. Moreover, updating of the distributed management system of preferred embodiments of the present invention to collect new types of data preferably does not require alteration of the messaging systems being monitored or even the assistance of personnel of the entity for which monitoring is being provided.

The use of the preferred embodiment probes in data collection systems providing collected data to a messaging server according to the present invention overcomes the problem of a fragmented view as is typically associated with the use of multiple vendor systems, such as different vendor's mail servers, anti-virus servers, wireless servers, and/or the like, in the messaging environment. The distributed management systems of the present invention preferably can collect data from any and all such sources and present the collected data in a single unified way, giving not only an enterprise-wide view but enterprise-wide control and the ability to accurately correlate events. For example, the use of such a system may be utilized not only to present data collected throughout the messaging environment via a unified console, but also facilitates a common source of configuration settings, such as to implement corporate standards or policies with respect to messaging systems. Accordingly, messaging system managers may more easily confirm that operation of the systems of the messaging environment are to specifications, even in locations remote to such managers.

A further advantage of the distributed management systems of the present invention is that centralized administration of messaging environments may be accommodated easily. For example, rather than providing a complete information technology (IT) staff at various sites throughout the world, an entity may deploy no IT staff, or perhaps a skeleton IT crew, at some locations and deploy a large central IT staff, such as at a home office, capable of monitoring and managing the messaging environment remotely using a distributed management system of the present invention.

Moreover, in a service provider implementation, such as described above, operation of preferred embodiments of the present invention enable comparisons of messaging systems and environments beyond entity boundaries. For example, various entities utilizing such a service provider to manage their messaging environments may be provided information with respect to how they compare to their peers or compare to industry data.

A further advantage of the service provider implementation is that entities for which messaging environment management is provided need not dedicate resources, including staff, to implementing, configuring, and maintaining systems for the monitoring of messaging systems. A service provider implementation of the present invention minimizes the investment of time, software, and hardware by the entities for which messaging system management is provided because the responsibility to deploy, maintain, and upgrade messaging system monitoring is built into the service offering and requires little direct assistance from the entity's personnel.

Preferred embodiment distributed management systems allow for the collection of raw messaging data by querying and probing various aspects of an entity's messaging environment, such as to collect raw information metrics from a variety of message servers. It is desired to provide actionable, measurable information that is readily useful, such as through analyzing raw data to provide conclusive statistics like the number of messages that were transferred on a particular day. However, it should be appreciated that raw messaging data as is typically available from the messaging systems of a messaging environment often does not translate directly or easily into information that is readily useful. For example, raw messaging data to be translated according to the present invention may come from a variety of different sources, such as from log files, services, performance counters and/or the like.

Generally, there is no particular way of telling that one piece of such data is significantly related to another piece of data, i.e., such raw messaging data generally has no particular correlation among the different types of data. For example, from the raw messaging data that is typically available, there is no indication that server down time, which may be gleaned from one source of information, is actually related to a spike in a message server CPU, which may be gleaned from another source of information.

Similarly, knowing the organizational structure of the messaging servers and how the servers all relate to one another may be extremely useful to a messaging environment manager. Directory information provides a sources of raw data with respect to servers of a messaging environment, however without correlation with other raw data about each of those servers there is typically no way to determine the organizational structure.

The seemingly simple query "how many messages did a messaging environment send or receive," presents difficulty in answering due to such complexities as the semantics of what is a message and how are those messages to be counted, in addition to the difficulties associated with the raw messaging data from which the answer may be determined is likely to be provided from a number of disparate data sources. It should be appreciated that a mailbox can be referenced in any number of different ways by different messaging environments, e.g., even within a single messaging environment, a mailbox may have many different addresses. Accordingly, identifying and understanding mailbox configurations may prove key to counting the messages accurately and, therefore, to providing information useful to the above query.

Raw data available from the messaging environment, in and of itself, is often not directly useful in responding to a manager's query, e.g., this raw data cannot be used actionably to make capacity planning decisions, to decide to roll out a new server, or to decide to take troubleshooting steps. Accordingly, messaging data collected from a messaging environment is not easily searchable or queriable.

Transforms of the present invention preferably correlate different types of messaging data, e.g., data that comes from different probes and/or data sources of a preferred embodiment, such as to correlate data by messaging server, users, messaging organizations, mailboxes, message types, message attributes, time, events, etcetera. Statistics derived according to preferred embodiments provide counts with respect to messages and/or mailboxes according to uniquely defined accounting standards. For example, preferred embodiment transforms enforce predefined standards for counting messages, such as by establishing message and mailbox identity so that as a message flows from one server to another, and/or one site to another, the message may be accounted for properly and consistently as a single message and tracked as the same message moving through all those different servers. Preferred embodiment transforms process data, such as the aforementioned message environment data and/or data provided from other sources, so that the data may be queried according to useful attributes, such as according to time, according to server, according to type, according to definable aspects, etcetera and combinations thereof, to provide actionable results that are relevant and meaningful to the messaging environments monitored.

Preferred embodiments of the present invention additionally provide aggregation of information over time and/or across messaging environments. For example, transforms of the present invention may aggregate messaging data received from a plurality of data collectors of a distributed management system and/or from a plurality of probes of data collectors, and to aggregate a variety of collected data associated with an entity's messaging environment. Such aggregation may additionally or alternatively be provided across messaging organizations (e.g., a globally distributed entity, having separate messaging organizations defined within one or more messaging environments, may wish to see company-wide messaging statistics and/or statistics associated with the separate messaging organizations). Aggregation of information provided according to the present invention may additionally or alternatively be provided across different entities. For example, various large entities may each potentially include different styles and types of messaging systems resulting in difficulty not only with respect to obtaining a unified view of that entity's messaging environment, but also in benchmarking performance etcetera against other entity's messaging environments. Preferred embodiments of the present invention provide for the correlation and aggregation of such data.

Preferably, in order to handle a large volume of data as may be expected from a relatively large messaging environment, transforms of the present invention aggregate statistics over time. Preferably, data is rolled up onto larger and larger timeframes, effectively pre-computing aggregates for such larger and larger time frames, such as for a day, week, quarter, year, so that less processing is required by the preferred embodiment data warehouse when providing information with respect to a large scale report. Accordingly, a user may view reports with respect to how many messages were sent or received between 3 and 4 p.m. today, when that information is likely to be useful. However, such information is typically far too granular for more long range reports, such as typically would be utilized at later periods of time, such as viewing a chart of message environment activity over the last year. Accordingly, the preferred embodiment aggregation provides for a running rollup of such data to provide the level of detail desired as well as to optimize resources for the handling of large amounts of data.

The foregoing has outlined rather broadly the features and technical advantages of the present invention in order that the detailed description of the invention that follows may be better understood. Additional features and advantages of the invention will be described hereinafter which form the subject of the claims of the invention. It should be appreciated by those skilled in the art that the conception and specific embodiment disclosed may be readily utilized as a basis for modifying or designing other structures for carrying out the same purposes of the present invention. It should also be realized by those skilled in the art that such equivalent constructions do not depart from the spirit and scope of the invention as set forth in the appended claims. The novel features which are believed to be characteristic of the invention, both as to its organization and method of operation, together with further objects and advantages will be better understood from the following description when considered in connection with the accompanying figures. It is to be expressly understood, however, that each of the figures is provided for the purpose of illustration and description only and is not intended as a definition of the limits of the present invention.

BRIEF DESCRIPTION OF THE DRAWING

For a more complete understanding of the present invention, reference is now made to the following descriptions taken in conjunction with the accompanying drawing, in which.

DETAILED DESCRIPTION OF THE INVENTION

Figure 1:
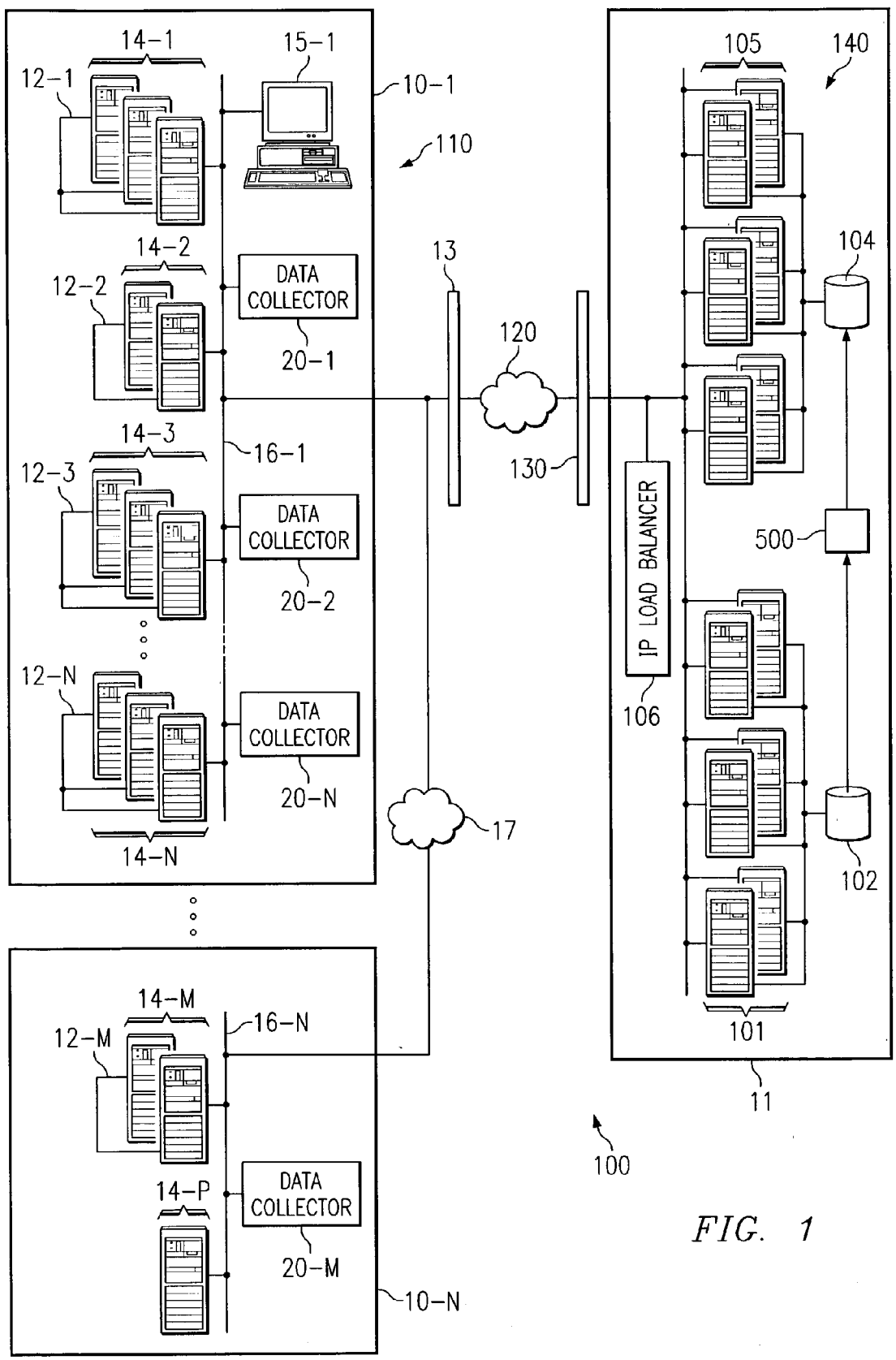
FIG. 1 shows a block diagram of a distributed management system of the present invention deployed with respect to a messaging environment according to a preferred embodiment.

Directing attention to FIG. 1 system 100 is shown in which a preferred embodiment distributed management system of the present invention is deployed to monitor and/or manage messaging environment 110. In the illustrated embodiment messaging environment 110 comprises a plurality of messaging servers 14-1, 14-2, 14-3, 14-M, 14-N, and 14-P (collectively messaging servers 14-1 through 14-P), such as may be mail servers, wireless servers, antivirus servers, access servers, etcetera, distributed at various geographic locations 10-1 and 10-N, such as may be associated with various offices of a business entity. Message servers 14-1 through 14-P may be comprised of various components, such as computer server systems operable under control of software defining messaging functionality, special purpose messaging systems including telephony systems, and/or the like.

The messaging environment being monitored/managed according to the present invention may utilize any number of communication links to provide information communication between the messaging servers thereof, such as bus links 12-1, 12-2, 12-3, 12-M, and 12-N (collectively bus links 12-1 through 12-N) and networks 16-1, 16-N, 17, and 120. Additionally or alternatively, such communication links may be utilized to provide information communication between a variety of other devices, such as between operator terminal 15-1 and one or more messaging server, between operator terminal 15-1 and one or more system external to messaging environment 110, between one or more messaging server and one or more system external to messaging environment 110, etcetera. Although a single operator terminal is illustrated to represent the various devices which may be included within or coupled to the messaging environment, it should be appreciated that any number and configuration of devices are intended to be represented, including computer consoles, telephone terminals, wireless terminals, and the like.

It should be appreciated that the aforementioned communication links may provide information communication in a variety of different protocols and may provide local or longer links. For example, network 16-N may provide a local area network (LAN), network 16-1 may provide a metropolitan area network (MAN), and network 17 may provide a wide area network (WAN), according to an exemplary embodiment.

Although the messaging servers of FIG. 1 are illustrated as all being deployed upon the same side of message environment firewall 13, it should be appreciated that a messaging environment may utilize one or more public networks, such as network 120, to provide intercommunication between messaging servers thereof. Therefore, embodiments of messaging environments may utilize a plurality of message environment firewalls, such as at a connection to each such public network, depending upon the topology used. Additionally or alternatively, a messaging environment or systems thereof may not utilize firewall protection.

In the illustrated embodiment of FIG. 1, the distributed management system of the present invention includes management server system 140, deployed at geographic location 11, coupled to the messaging environment to be monitored/managed via network 120. As with aforementioned messaging environment 110, management server system 140 preferably utilizes firewall 130 at a connection point to a public network to provide security, as is well known in the art. Of course various configurations of firewalls and/or security may be utilized according to the present invention, as desired. For example, where a private network is utilized to provide information communication of message environment metrics to management server system 140, firewall 130 might be eliminated.

The distributed management system of the illustrated embodiment includes data collectors providing information communication of message environment metrics to management server system 140 via network 120, such as may comprise the Internet, a LAN, a MAN, a WAN, the PSTN, a wireless network, a cable transmission system, and/or the like. Specifically, data collectors 20-1, 20-2, 20-M, and 20-N (collectively data collectors 20-1 through 20-N) of the preferred embodiment distributed management system are deployed within messaging environment 110.

Data collectors 20-1 through 20-N preferably include interfaces to facilitate communication with appropriate ones of message servers 14-1 through 14-P. Specifically, each of data collectors 20-1 through 20-N is preferably configured to communicate with a corresponding one or more of message servers 14-1 through 14-P to collect message environment metrics therefrom. Such message environment metrics may be collected from several different data sources on the messaging servers, as determined to provide information for a desired level of monitoring/management.

As an example, message servers 14-1 and 14-2 may comprise MICROSOFT EXCHANGE servers, from which specific pieces of data regarding their operation and/or configuration are desired for monitoring/management of the messaging environment. An important piece of data for management of the messaging environment may be information relating to the directory of the server, which includes information such as all of the mailboxes that are on the particular server as well as the different servers that are in the messaging environment. Another piece of information available from such servers which may be important for monitoring/management is the tracking logs, which are the logs of all the message traffic that passes through the server. Another possibly important data source on these servers may be the performance counters which provide specific values that indicate the functions or status of the server at a particular point in time. The actual message text or full body of the messages may provide another important data source. A data source which may also provide important information is information about its disk drives, e.g., how much space is available, how large the drives are, etcetera. The "data storer," which provides information with respect to where messages are stored, how large the message is, and other statistics, may provide a useful data source. Additionally, WINDOWS services may provide an important data source with respect to the actual processes or programs running on the servers. Similarly, the event service, event logs and registry may provide data of interest for monitoring/management according to the present invention. Accordingly, data collectors of the present invention, such as data collector 20-1 of the illustrated embodiment, may be adapted to collect any combination of the aforementioned data and/or other available data from messaging servers 14-1 and 14-2 for use according to the present invent.

It should be appreciated that there are many types of mail servers in addition to the aforementioned EXCHANGE servers, as well as other types of messaging servers, that may be included in a messaging environment monitored/managed by the distributed management system of the present invention. For example, mail servers such as LOTUS NOTES, SEND MAIL, NOVELL GROUPWISE, etcetera may be utilized in messaging environment 110 in place of or in addition to the aforementioned EXCHANGE servers. Examples of other types of message servers include wireless servers, such as those available from Research In Motion (RIM) Corporation or from Microsoft Corporation, and virus servers, such as those available from Trend Micro, Symantec, McAfee, and Sybari. Accordingly, one or more of data collectors 20-1 through 20-N may be configured to collect appropriate/desired data, similar to that described above with respect to the EXCHANGE servers, from such messaging servers.

From the above, it should be appreciated that a data collector of the present invention may preferably collect data from one or more message servers of the messaging environment to be monitored/managed. Moreover, the message servers from which data is collected by the preferred embodiment data collectors may be the same or different configurations of message servers. Accordingly, there may or may not be a one to one correspondence between the number or type of message servers in the messaging environment and the data collectors deployed according to the present invention. In the illustrated embodiment, data collector 20-1 is adapted to collect data from message servers 14-1 and 14-2, data collector 20-2 is adapted to collect data from message server 14-3, data collector 20-N is adapted to collect data from message server 14-N, and data collector 20-M is adapted to collect data from message servers 14-M and 14-P.

Data collectors of the present invention are preferably configured to automatically discover the systems and configuration of the messaging environment. For example, a data collector may passively monitor communications and/or actively poll systems to determine aspects of the messaging environment. The data collector may interact with management server system to obtain information, perhaps including software modules configured for identified aspects of the messaging environment, in order to complete or substantially complete an automatic configuration process.

Additionally or alternatively, data collectors of the present invention may operate in a declared configuration, if desired. For example, information with respect to the messaging environment and systems thereof may be provided to a data collector, such as by a field technician or an operator of a corresponding management server system, to configure the data collector for data collection.

The preferred embodiment data collectors are configured for probing data sources associated with corresponding ones of the message servers. Accordingly, the data collectors of the present invention preferably comprise a plurality of components to result in the desired functionality. Directing attention to FIG. 2, a functional block diagram of a preferred embodiment data collector of the present invention is shown.

The preferred embodiment data collector comprises a processor based system, such as a computer system operable upon the well known INTEL PENTIUM family of processors or the MOTOROLA POWERPC family of processors, having memory and input/output interfaces and operable under an instruction set defining operation as described herein. For example, a WINDOWS NT environment or other operating system may be utilized to provide servicespace 210 in which various software components operate to provide functionality as described herein. The software components shown in the illustrated embodiment include probes 220-1, 220-2, and 220-Y, scheduler 201, messaging module 202, audit/security module 203, and diagnostic module 204. Of course, the functionality described herein may be provided through use of additional and/or alternative components of a data collector of the present invention, if desired.

Figure 2:
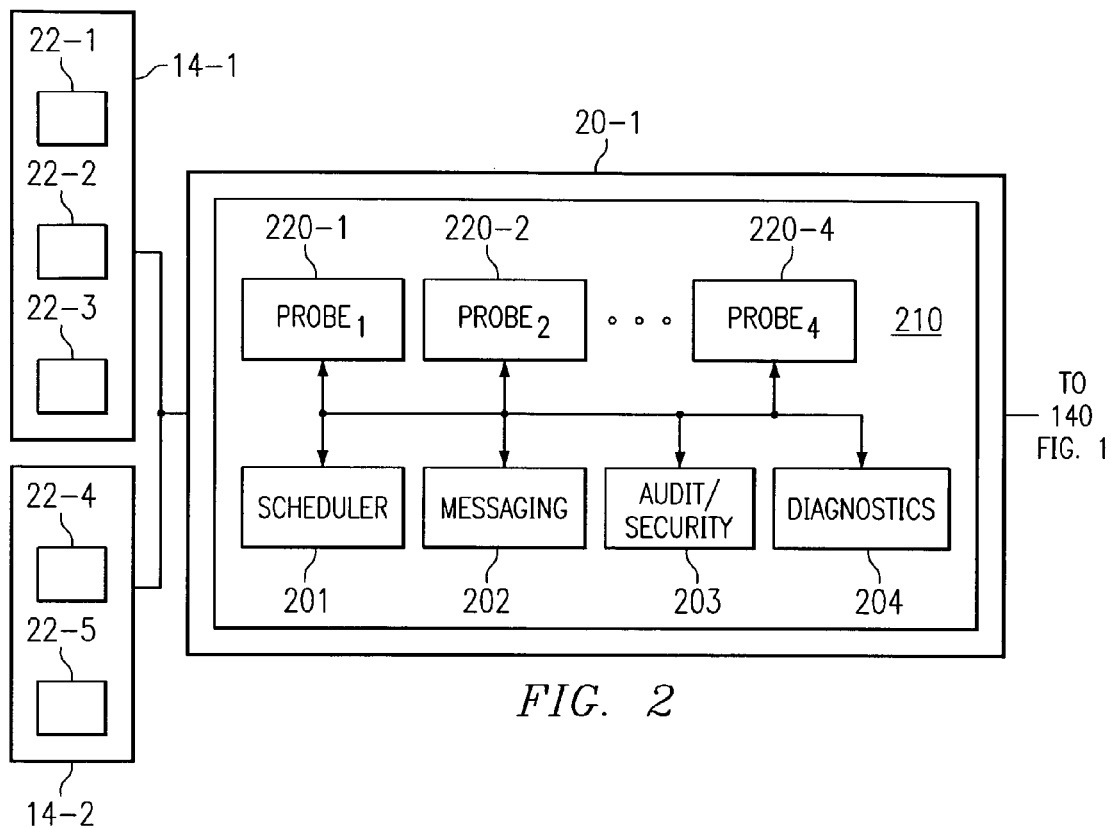
FIG. 2 shows a block diagram of a data collector according to a preferred embodiment of the present invention.

For example, data collector 20-1 of FIG. 2 may include a gateway, such as to provide interconnection with another data collector of the present invention. Using such a gateway, several data collectors deployed within a messaging environment may collect data from messaging environment systems and communicate the collected data to common data collector of the present invention. This common data collector may aggregate the data collected by the other data collectors and/or process/further process the data for providing information to a management server of the present invention.

According to the preferred embodiment, processing flow within the servicespace is controlled by scheduler 201. For example, scheduler 201 may read a configuration file associated therewith to determine what probes exist and at what schedules they should be awakened to provide data collection according to the present invention. Accordingly, scheduler 201 may periodically wake up a particular probe of probes 220-1 through 220-Y to cause it to interact with an appropriate one or more of the message servers, here message servers 14-1 and 14-2, and retrieve selected information available from the data sources, here data sources 22-1 through 22-5.

Accordingly, inside a running servicespace of the illustrated embodiment, scheduler 201 is preferably the module that controls what happens and when it happens. Scheduler 201 accomplishes this functionality according to the preferred embodiment by reading information from an associated configuration file, determining when different functions need to be performed, and instigating the modules having the appropriate functionality. For example, the scheduler may look to the preferred embodiment configuration file to determine, for each probe, the frequency at which it is to be run to accommodate probes which are desirous of being run very often, such as every few minutes, and other probes that need not be run so often, such as those to be run once per day, as may depend upon the types of data collected by the probe and how often that data changes. The timing for operation of the probes may be established by such considerations as when the data to be collected is likely to be refreshed or the timing may be selected so as to lessen the impact on the operation of the messaging environment, such as to operate during the night or early morning for probes which are activated once per day. Using such a scheduler and configuration file, each probe may be operated with its own frequency and timing, and such frequency and timing attributes may be easily altered.

The preferred embodiment scheduler has no or little part in what the particular modules actually do when instigated, except perhaps to notify the modules of a desired function from a plurality of functions available from the module and/or to confirm that a module has performed as scheduled. Accordingly, the preferred embodiment modules operate independent of the scheduler upon instigation. For example, the aforementioned probes preferably control how they communicate with the message servers, what information they retrieve from the message servers, and what they do with the information retrieved.

Preferred embodiment schedulers operate to determine if an awakened module succeeds or fails in the scheduled task. For example, when the scheduler wakes up a specific probe it preferably knows if that probe succeeds or fails in its schedule task. If the probe is determined to have failed in the scheduled task, the scheduler preferably waits a predetermined amount of time and again awakens the probe to try it again, preferably up to some configurable retry count. The amount of time a scheduler waits for a retry is preferably configurable on a per probe basis. Similarly, if a server is not responding at the time that a probe wakes up to gather data, either the scheduler or probe of the preferred embodiment will recognize the condition, continue dealing with the other servers, and come back to the unresponsive server at a later time to gather the data. A configurable retry count may be implemented for limiting the number of attempts made to gather data from such a server, if desired.

The probes of the preferred embodiment are linked to or collect data from a particular data source or sources. So for instance, data sources 22-1 and 22-4 may comprise the directory of the respective one of message servers 14-1 and 14-2. Accordingly, probe 220-1 may be configured to probe data sources 22-1 and 22-4 for the directory images and/or directory data source report. Similarly, data source 22-3 may comprise WINDOWS services and, therefore, probe 220-Y may be configured to probe data source 22-3 for the actual processes or programs running on message server 14-1. Accordingly, it should be appreciated that various probes utilized according to the present invention may be configured differently, although such probes may share common features/functionality, such as interoperability with a scheduler and messenger of the present invention.

The probes of the preferred embodiment subdivide the collection of desired data into specifically configured modules. For example, it does not always make sense for each probe to run against each of the known servers as some probes probe data that only exists on certain types of servers, or there are servers that for some other reason data does not need to be probed. Accordingly, each probe preferably has a concept of the server or servers for which it is enabled. This preferred embodiment configuration allows different probes to run against different sets of servers from the same data collector. Moreover, it should be appreciated that such probes facilitate simplified and rapid upgrading to accommodate changes in the messaging environment, such as upgrading of the software of a particular message server, addition of a new message server, removal of a previously existing message server, collection of data from a new or different data source, etcetera.

Probes of the present invention may communicate with several servers and/or, in some cases, may iteratively communicate with a particular server. Accordingly, preferred embodiment probes implement a "partial success" mechanism, which allows the probe to keep track of which servers it has run against and which pieces of its operation has been completed with respect to particular servers. Such a mechanism preferably ensures efficient and complete collection of data, even in the event of a crash or partial crash of the probe or a system associated therewith. The preferred embodiment partial success mechanism may be implemented in all probes of the present invention, irrespective of the particular servers they are configured for and/or data collected.

Any time a probe is awakened for any particular task, the probe preferably sends an audit message to a dominant system, such as the management server system, to provide a record of its operation. This auditing functionality is another feature which may be common to all probes, irrespective of the particular servers they are configured for and/or data collected.

Preferably, some or all of the probes allow manual or non-scheduled querying of systems of the messaging environment, such as under control of messages provided by the management server system. For example, where a manager sees a problem getting data from one particular server a corresponding probe of a data collector may be signaled to attempt to probe that server again. Similarly, where configuration changes have been made it may be desirable to confirm correct operation of particular systems and, accordingly, manual probe runs may be queued through the messaging system with a message from the management server system to the data collector that tells it to run a probe and return the data to the management server system.

According to a preferred embodiment, some probes may have dependencies on other probes. Accordingly, the data collectors preferably implement a mechanism for making sure that if a particular probe (e.g., probe 220-2) depends upon another probe (e.g., probe 220-1), that the master probe is always started before the dependent probe ensure proper operation thereof.

It should be appreciated that the probes of the present invention are not limited to the collection of data from corresponding ones of the message servers. Accordingly, probes of a preferred embodiment may be utilized to proved signaling to such message servers. For example, where monitored metrics indicate a less than optimum configuration of a message server, a probe of the present invention, whether autonomously or under control of another system such as a message server of the present invention, may communicate with the message server to cause its reconfiguration to a more optimized configuration. Similarly, where a malfunction is detected with respect to a system or systems of the messaging environment, a probe or probes of the present invention may communicate with message servers to provide control for minimizing the impact upon the messaging environment.

After collecting data from the message servers, the probes of the preferred embodiment pass the data to another module of the data collector. A probe of the present invention may pass collected data to a process that aggregates and/or processes the collected data. For example, a statistical engine (not shown) may analyze the collected data to provide a statistical summary to a management server of the present invention. Additionally or alternatively, probes of the present invention may perform filtering, aggregation, and/or processing of the data that they gather. For example, preferred embodiment probes may gather a lot of data and either remove some of the data and report only what is identified as important and/or process the data and only report the aggregates of that data that it collected.

Distilling collected data in such a way prior to its transmission to the management server may be useful in reducing the amount of communication capacity consumed by use of the present invention. Moreover, as the data collectors of the preferred embodiment are deployed within the messaging environment itself, i.e., within the protection of firewall 13, such an embodiment may be utilized to avoid transmission of sensitive raw data outside of the messaging environment while still providing a desired level of information to the messaging server.

In the illustrated embodiment of data collector 20-1, after collecting data from the message servers, the probes pass the data to messaging module 202 running inside the servicespace. Messaging module 202 of the preferred embodiment is the module the provides the functionality for information communication between the data collector and the management server of the present invention. Accordingly, messaging module 202 may encapsulate, modulate, or otherwise manipulate and/or package collected information for transmission to a corresponding management server. In the illustrated embodiment, wherein network 120 comprises the Internet, messaging module 202 may packetize data provided by probes 220-1 through 220-Y in an Internet protocol (IP) format having a media access control (MAC) address associated with management server system 140.

Messaging module 202 may cooperate with other modules of data collector 20-1 in providing the desired communications. For example, audit/security module 203 may provide encryption of data to be transmitted via a public network by messaging module 202.

Preferably, messaging module 202 provides queuing of collected information and/or other information, such as status messages from various modules of data collector 20-1, to be communicated by data collector 20-1, such as to management server system 140 and/or to other data collectors. Accordingly, messaging module 202 may operate under control of scheduler 201 to provide information communication from data collector 20-1, such as to minimize impact upon the messaging environment, to coordinate reporting with other data collectors within the messaging environment, etcetera. Moreover, such queuing may be utilized to ensure that collected data is provided to a management server of the present invention, even in the case where communication links are unavailable for a period of time. Such a feature is particularly useful for making sure that a data collector is able to report to a management server even when a persistent and reliable network link is not available.

In addition to providing messaging outbound from the messaging environment to be monitored/managed, messaging module 202 of the preferred embodiment also facilitates inbound messaging from an appropriate management server of the present invention. For example, management server system 20-1 may occasionally or periodically call upon various probes to capture some information and check the information returned against thresholds to confirm proper operation of the messaging environment, or systems thereof, in an effort to determine whether it is appropriate to send alerts and/or how alerts should be sent. Accordingly, messaging module 202 may receive control messages from messaging server system 140 for controlling probes of data collector 20-1 to collect additional data. Once such additional data is collected, the probes may operate to provide the collected information to another module of the data collector, as described above.

Messaging module 202 of the preferred embodiment is configured to accommodate inbound messages in addition to aforementioned messages with respect to the probes collecting data. The inbound messages may be anything from new configuration files to updated software modules. Accordingly, aspects and activities of the preferred embodiment data collector can be controlled remotely by sending appropriate messages. Such messages may include various diagnostics messages or audit messages, such as may be directed to audit/security module 203 and/or diagnostics module 204, to troubleshoot the operation of the data collector or otherwise keep apprised of its continued operation.

From the above, it should be appreciated that messages that are sent and received by the preferred embodiment data collector generally fall into one of three categories. The first category is data coming from the data collector. This is data is generally that which the probes have gathered, typically from the messaging servers, that the data collector provides to the management server for various forms of monitoring and historical reporting. The second category of data is configuration or software updates provided by the management server to the data collector. This data generally corresponds to the rolling out of a new software version or making of changes to the data collector's configuration. The third category of data is typically bi-directional and includes data collection requests, audit requests, and diagnostic messages. Such messages may be provided from a management server to request status, restart the data collector, etcetera.

Preferably, all the above communication is provided over a messaging link which is encrypted and secure, such as through use of secure sockets layer (SSL). The connection is preferably authenticated to avoid having someone else pose as either a data collector or a management server in order to intercept the communications stream. Moreover, as mentioned above, such messaging is preferably managed so as to guarantee that a message will always get through to the intended destination, even if the network layer is down. The messaging system may also be redirected through a proxy, such as a http proxy as is well known in the art. The use of such a proxy may be desirable in allowing the above communications to pass through a firewall without requiring special configuration of the messaging environment, where a proxy server already exists.

According to a most preferred embodiment, the communication link between a data collector and a corresponding management server of the present invention is initiated in only one direction. Specifically, as the data collected and/or available from the messaging environment may be sensitive, the preferred embodiment data collectors are the initiators of any communication link external to the messaging environment. Accordingly, the risk of external devices being able to establish a communication link with data collectors of the present invention is minimized. Moreover, as the data collectors of the preferred embodiment are disposed within the messaging environment, their initiating the communication links with a corresponding management server facilitates their deployment with little or no alteration of an existing firewall and/or message environment security system. Similarly, the use of a http proxy server, wherein known ports, such as port 80 or port 443 which are used for http or https traffic, for communication may be relied upon to simplify deployment of the data collectors because additional ports need not be opened up upon the firewall.

It should be appreciated that once a data collector of the preferred embodiment has initiated a connection with a management server, data can flow in both directions on that connection and, therefore, management servers may operate to request data collection, audits, diagnostics, etcetera via such a connection as discussed above. Accordingly, the preferred embodiment data collector works to keep a connection open to the management server system at all times such that preferred embodiment data collectors operate to keep a connection with a corresponding management server system open even when the data collector does not have any data to provide thereto. If the connection closes for some reason, such as because of a network outage or some other error, the data collector will preferably try to reconnect very frequently until the connection is re-established. This preferred embodiment operation facilitates communications from a corresponding management server system for diagnostics etcetera as described above.

As discussed above, according to the illustrated embodiment scheduler 201, probes 220-1 through 220-Y, and messaging module 202 cooperate to collect data from within messaging environment 110 and return that data, or portions thereof, to management server system 140, such as through firewall 13, via network 120, and through firewall 130. Preferably management server system 140 receives similar data from a plurality of data collectors, perhaps including data collectors deployed in messaging environments other than messaging environment 110. For example, according to a preferred embodiment, management server system 140 may be coupled to data collectors deployed in a plurality of entity's messaging environments, such as to provide a service bureau embodiment for monitoring and/or managing messaging environments and/or to provide comparative data across messaging environments.

Directing attention again to FIG. 1, the illustrated embodiment of management server system 140 is shown to include collector farm 101, staging database 102, data warehouse 104, reporter farm 105, load balancer 106, and transforms 400. Collector farm 101 and reporter farm may each include one or more servers, such as may comprise computer systems having a processor memory, and input/output interfaces and operating under control of an intrusion set, for accommodating the volume of data being processed by management server system 140. It should be appreciated that, although shown as being disposed at geographic location 11 in the illustrated embodiment, the various components of a management server system of the present invention may themselves be distributed throughout a number of geographic locations and/or utilize a variety of communication links to provide information communication therebetween.

Load balancer 106 is preferably provided as a part of the management server system to ensure availability of desired functionality. Specifically, load balancer 106 may operate to direct/redirect information to various systems of collector farm 101 and/or reporter farm 105 depending upon availability. Additionally or alternatively, load balancer 106 may operate to spread out the processing load across multiple systems of collector farm 101 and/or reporter farm 105.

Preferably, as collected data is received from a data collector by management server system 140, the data is accepted into a system of collector farm 101 for parsing and storage in staging database 102. According to the preferred embodiment, for each data source being monitored there is a corresponding probe which runs on a data collector, as discussed above, as well as a corresponding piece of software that runs on collector farm 101 to parse the data into the appropriate position of staging database 102.

Preferably, the process of receiving collected data and parsing the data into staging database 102 is performed throughout the day with respect to some or all the collected data. For example, it may be desirable to input data into staging database 102 in different ways based on the types of data that the data collectors are sending. For instance, there may be some data that it is desirable to insert into the staging database right away, such as to allow certain portions of the management server system to react quickly in response thereto. Such information may include critical errors or conditions which trigger alarms, thereby allowing systems of reporter farm 105 to quickly recognize the status and provide the alarms. Other pieces of data, however, may be inserted into staging database 102 on a delayed or scheduled basis, such as for performance/availability reasons. For example, data that is collected daily typically need not be inserted into the staging database right away and, therefore, may be scheduled for insertion at times to distribute the processing load of the management server system.

As described above, multiple paths into the staging database may be implemented according to the present invention, such as based upon requirements of the different types of data collected. Preferred embodiments of the present invention may utilize a system of flat files to accomplish the delayed entry of collected data into the staging database. For example, a database flat file, which is a file that gets built up over time or small files that are eventually consolidated into one big file, may be utilized to store collected data temporarily and then loaded into the database on a scheduled basis. Accordingly, a typical flow of data may include the following steps: a data collector sends data to the management server system, a flat file is written by a collector farm system, and, at some later point in time, another process that runs on the collector farm system wakes up, consolidates the individual flat files into a single flat file, and loads the consolidated flat file into the staging database. A benefit of this configuration is that collected data may be managed in multiple places. Additionally, this configuration allows for much greater performance and much less load of the database throughout the day.

According to a preferred embodiment, at a specific scheduled time or times, such as early in the morning or periodically throughout the day, or upon the occurrence of particular events transforms 500 operate upon data stored in staging database 102 to aggregate, analyze, distil, and/or otherwise manipulate the data for providing desired information therefrom. Details with respect to the operation of preferred embodiments of transforms 500 are provided below with reference to the exemplary flow diagram of FIG. 4 and the functional block diagram of FIG. 5.

Figure 5:
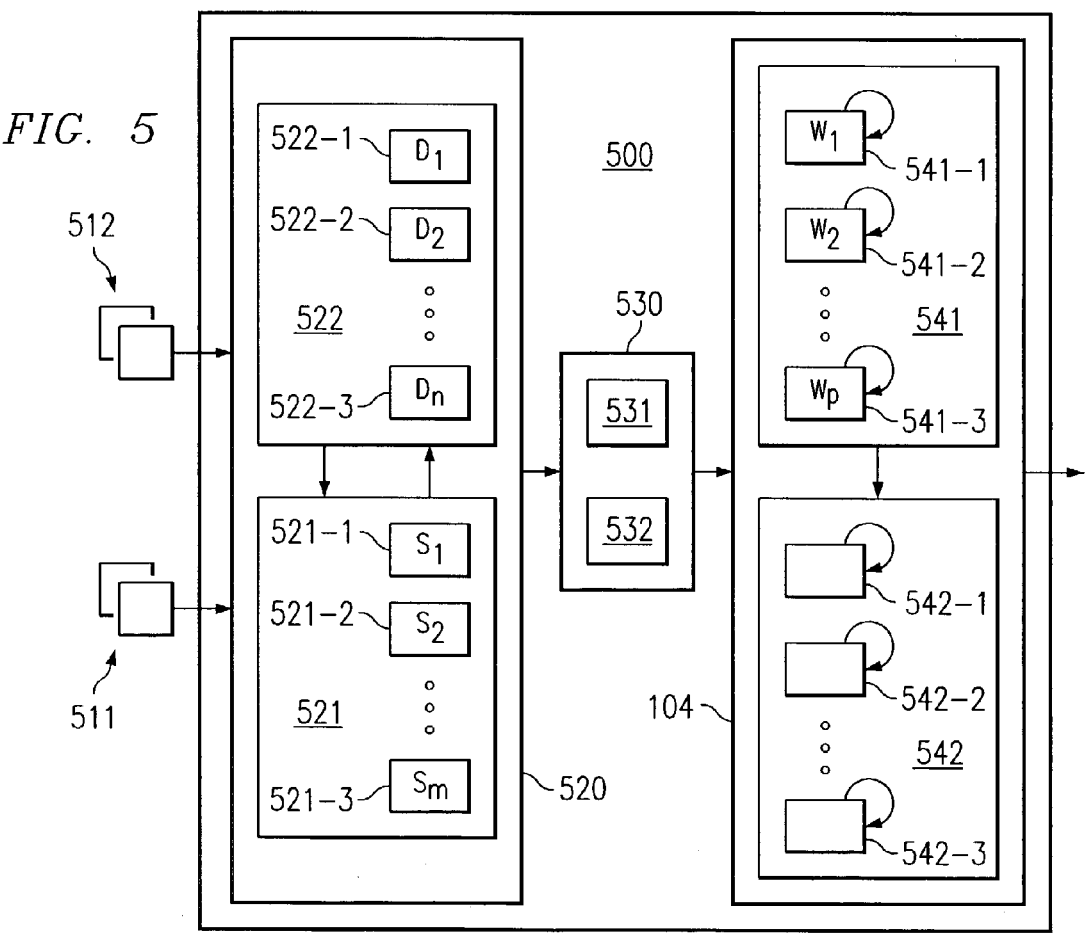
FIG. 5 shows a block diagram of transforms of a preferred embodiment of the present invention.

With reference to FIG. 5, new raw data (raw messaging data 511 and other raw data 512) as may be collected from various messaging environments and as may be available from other sources is accepted by preferred embodiment transforms 500. It should be appreciated that transforms 500 may be embodied as a processor based system operating under control of an instruction set defining operation as set forth herein. For example, transforms 500 may comprise a general purpose processor-based system, such as a personal computer operable upon the INTEL PENTIUM or MOTOROLA POWERPC processor platforms, having a memory (RAM, ROM, magnetic disk, optical disk, and/or the like), preferably storing the aforementioned instruction set and/or data to be processed and analyzed and the results thereof. A general purpose processor-based system comprising transforms 500 of the preferred embodiment may further have suitable input/output devices (keyboard, mouse, touch screen, video display, printer, scanner, microphone, video camera, sound interface, serial interface, parallel interface, network interface, and/or the like) for accepting messaging environment and other data, interacting with operators, and providing information thereto.

Preferably, acceptance of raw data by transforms 500 comprises intelligently parsing data in order to accept and process data of interest according to the present invention. For example, data correlator/parser 520 preferably operates to identify data within the new raw data providing updated information with respect to existing data (step 401 of FIG. 4) to thereby update the existing data (messaging data 521 and other data 522). For example, one piece of the existing data (e.g., messaging data component 521-1) may comprise directory data, such as may provide information with respect to what mailboxes, servers, etcetera exist in a messaging environment. If a new mailbox has been created or an existing mailbox has had some change made to it, data correlator/parser 520 preferably recognizes the pertinent information in the new raw data provided thereto (raw messaging data 511) and updates an appropriate portion (messaging data component 521-1) of messaging data 521.

Transforms of the present invention are preferably adapted to accommodate a variety of data from a variety of sources, including data from messaging environments of different organizations and entities. Accordingly, correlator/parser 520 may utilize information in new raw data useful in associating the data with a particular user, mailbox, system, environment, organization, entity, and/or the like. For example, mailboxes can preferably be grouped according to arbitrary attributes, as well as their server based organization. Accordingly, embodiments of the present invention are particularly useful in scenarios wherein an entity provides for outsourcing of mail functions for other companies.

For example, a service may be provided in which mail servers and/or other systems of a messaging environment are deployed at customer locations by a service provider. The service provider may be enabled to run and manage the messaging environment system, including providing mailboxes to individuals, managing servers, etcetera, using information provided by transforms of the present invention and/or remote management/monitoring capabilities of management server systems of the present invention that have the capacity to run, measure, and provide reports based on the function of the mail environments. It is very desirable in such situations to provide information in terms of the end clientele, not in terms of the ASP mail provider's actual organization. Systems of the present invention are preferably configured for multiple customers, and the servers and organizations and mailboxes that belong to various such customers. Accordingly, the present invention provides the ability to provide reports based on a subset of the actual messaging server organization, e.g., based on a true end customer.

Preferably, transforms of the present invention are adapted to identify duplicate data and other error prone input. For example, correlator/parser 520 of the preferred embodiment operates to identify duplicate data prior to updating messaging data 521 to insure the accuracy and correctness of information provided according to the present invention. Such duplicate data may result from the same data having been collected from multiple data sources or may be associated with probes and/or systems associated with the data sources being restarted etcetera, for example.

It should be appreciated that data parsing and/or correlation according to the present invention is not restricted to raw messaging data. For example, other data 522 may comprise information with respect to message system attributes to be analyzed (other data component 522-1) which other raw data 521 may update from time to time. Moreover, data parsing and/or correlation according to the present invention is not restricted to operations directly with respect to raw data input to transforms 500. For example, correlation may be provided between messaging data 521 and other data 522, such as for configuring messaging data 521 for use with new/different raw messaging data in response to other raw data indicating a user desiring information with respect to a different aspect of the messaging environment.

Preferably, data correlator/parser 520 not only operates to parse and/or correlate data in order to update existing data to reflect the current state of a monitored messaging environment, but also preferably operates to correlate disparate data sources (step 402 of FIG. 4) to facilitate a unified view of the messaging environment. Accordingly, data correlator/parser 520 of the preferred embodiment may correlate seemingly unrelated raw data components with each other and/or with the existing data components to provide useful information. For example, tracking log files may provide information that identifies the name of a mailbox that a message is from and the name of a mailbox that message is to. Data correlator/parser 520 may correlate the mailbox identification of raw tracking log file data (e.g., as provided with raw messaging data 511) with mailbox information in directory tables (such as may be stored and updated as messaging data component 521-2) to provide a canonical name or ID of that mailbox for updating of a portion of messaging data 521 (e.g., messaging data component 521-3), such as for use in counting the message according to the present invention.

Specifically, in the above mailbox name example, a user may have different aliases associated with a single mailbox. Accordingly, someone might send a message to jocelyn@messageone.com while another might send a message to jocelyn_goldfein@messageone.com, all to reach the same mailbox owner. In order to provide meaningful reporting according to preferred embodiments of the present invention (e.g., attributing all such mail to a singular source or single recipient), a single canonical reference to the mailbox owner is preferred so that queries, such as what individual sent the most messages or what individual received the most messages, are answered accurately.

It should be appreciated that the above example with respect to mailbox aliases is but one example of disparate kinds of data that may be correlated according to the present invention. Accordingly, various other forms of data may be correlated for providing useful information according to embodiments of the present invention, such as by recognizing keys between the data. For example, there are a variety of identifiers in the data that may be utilized in providing meaningful correlation.

One such identifier useful according to the present invention is time. Raw data may be received from a first data source indicating an event at a particular time, e.g., 6:05 p.m. Central Standard Time, and raw data from another data source may indicate an event also occurring at or near the previously mentioned particular time, e.g., at 6:08 p.m. Central Standard Time. It may be assumed that events having the same or similar time information and/or particular events having time information in an expected sequence may be understood to go together.

A level of resolution with respect to such time information may be established which allows meaningful correlation without requiring excessive processing power to analyze and compare the time information. For example, a preferred embodiment utilizes an hour as the smallest increment of time. In such an embodiment, all the data that happened in the same hour, no matter what data source it came from, may be assumed to be potentially correlated. Of course, finer or different time resolution may be utilized, if desired.

Another identifier useful according to the present invention is the identity of the server, e.g., what messaging server does a piece of data apply to. If the same things in different data sources were happening to the same server, then it may be assumed that those data can be associated together.

Still another identifier useful according to the present invention is the identity of the mailbox. Although, as discussed above, a mailbox may be referenced through the use of a variety of aliases, the full directory information for the messaging environment is preferably available according to the present invention, thereby facilitating the correlation of any data associated with any such alias with one mailbox. For example, whether it is data indicating what the mailbox's storage size limits are for any user on a given server, it is data indicating the last time a user logged into a mailbox, or it is data indicating that a mailbox belongs to a particular server, all of this data may be tied together through use of the identity of the mailbox and reference to directory information according to the present invention.

Message ID provides another identifier useful according to the present invention. For example, most messaging systems have a singular message ID which follows a message throughout its life cycle. Some of the data sources probed according to the present invention provide records or logs of events that indicate services provided with respect to a message, e.g., the message was transferred between one server and another, a distribution list on the message was expanded, the message was sent off to the Internet through SMTP, etcetera. Using message ID identifiers, preferred embodiments are able to correlate each of those events together and know that they apply to the same message.

Moreover, it should be appreciated that combinations of the above indicators may be utilized in providing robust data correlation according to the present invention. For example, from the discussion above, it should be appreciated that the particular mailboxes that messages apply may be correlated to message data in combination with the above services performed in order to provide particular counts according to the present invention. Similarly, the servers to which the messages apply, such as from home servers of those mailboxes as may be determined from analysis of directory information, and/or the servers that recorded the events of the message being sent may be correlated to the data according to the present invention.

The use of combinations of identifiers may be particularly useful with respect to implementations in which multiple entities' messaging environments are monitored and/or managed. For example, the aforementioned mailbox identifiers and server identifiers may be utilized not only to determine what mailbox a particular piece of data is associated with, but what entity that particular mailbox is associated with. This allows for distinguishing between, for example, multiple entities that have servers with the same name.

Figure 4:
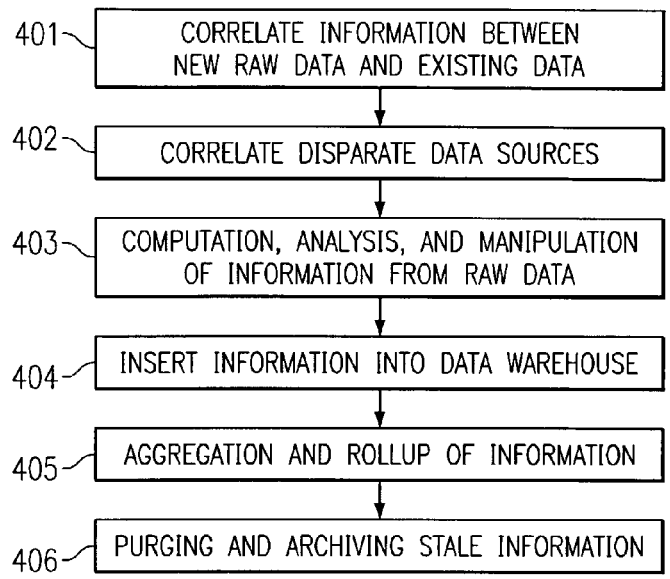
FIG. 4 shows a flow diagram of operation of transforms of a preferred embodiment of the present invention.

Once data has been parsed and/or correlated by data correlator/parser 520, preferably including identifying keys between data and updating messaging data 521 and/or other data 522 accordingly, transforms 500 of the preferred embodiment utilizes data computation/analyzer 530 to further process the data (step 403 of FIG. 4). Data computation/analyzer 530 preferably provides computation and/or analysis with respect to messaging data 521 and/or other data 522 to manipulate the data into a form more directly useful for providing reporting or otherwise for providing a view of the operation of messaging environments.

For example, data computation/analyzer 530 may provide aggregation of data, such as over time, across servers of a messaging environment, across organizations of a messaging environment, and/or across messaging environments of different entities. Accordingly, data computation/analyzer 530 of the preferred embodiment includes aggregation engine 531.

Additionally or alternatively, data computation/analyzer 530 may provide statistical analysis of the data, such as to count the messages that came to/from a specific mailbox, count the messages including attachments for each mailbox, determine the amount of data transmitted/received from a specific mailbox or server, categorize and summarize the types of messages being communicated, identify external verses external messages and provide counts with respect thereto, etcetera. Accordingly, data computation/analyzer 530 of the preferred embodiment includes statistical engine 532.

Statistical engine 532 of the preferred embodiment preferably comprises information for enforcing counting standards for providing meaningful analysis according to the present invention. For example, it may be desirable to provide reporting with respect to internal messages and external messages. However, it is often not a bright line which demarcates internal and external messages. Accordingly, statistical engine 532 of a preferred embodiment includes information for constantly identifying internal verses external messages in a predetermined manner. Similarly, statistical engine 532 of a preferred embodiment includes information for constantly counting messages in a predetermined manner, particularly in light of different services being performed with respect thereto.

For example, a message may originate within a messaging environment being monitored, traverse a public network to reach remote systems of the messaging environment, and be delivered to a user via systems of the messaging environment. Statistical engine 532 of the preferred embodiment may be configured to interpretively recognize this as an internal message as it both originates and terminates within the messaging environment. However, it should be appreciated that statistical engine 532 of this embodiment must be sophisticated enough to avoid mischaracterizing the message as external based upon its having been sent outside the messaging environment by the sender and/or its having been received from outside the messaging environment by the receiver.

As a further example, a message may be sent to a mailing list of 10 recipients. Statistical engine 532 of the preferred embodiment may be configured to count this as one message sent when it originates within a messaging environment being monitored. However, statistical engine 532 of the preferred embodiment may be configured to interpretively count this as 10 messages received when each such message terminates within the messaging environment being monitored.

As a still further example, it may be desirable to determine a last time a mailbox was accessed. However, there are a number of different ways a mailbox can be accessed. Accordingly, different data sources and/or different ones of the preferred embodiment probes may provide information useful in determining a last time a mailbox was accessed. Statistical engine 532 of the preferred embodiment may compare the access of a particular mailbox or mailboxes across different kinds of messaging data determined to be indicative of mailbox access in order to provide interpretive information with respect to a last access.

It should be appreciated that there are a variety of situations where messaging data is subject to interpretation. Accordingly, the preferred embodiment statistical engine is configurable to enforce desired counting and other statistical standards to provide results interpreted in a meaningful way. Moreover, the preferred embodiment standards are configurable to facilitate adaptation of the interpretation to fit individual needs and/or for reconfiguration.

According to a most preferred embodiment, data computation/analyzer 530 provides computation and analysis of messaging and other data to provide interpretive information with respect to various aspects of message count, message size, attachment count, and attachment size as described below.

Message count and message size information is preferably based on message server tracking logs. Specifically, message server tracking logs record various events in the lifecycle of a message, which may be utilized according to the present invention to interpret the message traffic on the whole.

For example, a message is preferably counted for a particular server to provide per-server message totals if the message ID shows up in that server's tracking log with one or more particular event codes, such as one or more of the following event codes: 4, 9, 1000, 1013, 1019, 1027, or 1028 (see below for meanings of these event codes of a preferred embodiment). Per-server message counting according to the preferred embodiment is independent of sender or recipient and, accordingly, moving a mailbox from one server to another will not affect historical per-server statistics.

Preferably, messages are not separately counted for an entire entity, such as to conserve processing and storage resources. Accordingly, the preferred embodiment sums per-server message statistics across all servers of an entity's messaging environment in order to provide "entire entity" totals. It should be appreciated that a message that appears in two servers' tracking logs, and therefore counted on both servers, will be counted twice in the "entire entity" reports according to this preferred embodiment. This provides a reasonably accurate representation of overall organizational message delivery capacity. Of course, embodiments of the present invention may provide for separate calculation of messages for an entire entity, if desired.

It should be appreciated that the total number of messages sent and received across all departments or all users can be somewhat different than the total across the entire entity. This may be because, for example, non-mailbox users may be sending messages through the servers. For example, alerts and alarms sent through the messaging systems by the preferred embodiment distributed management system may be counted as messages processed by a server although it is not sourced by, and perhaps is not directed to, a mailbox of the messaging environment. However, these messages are preferably counted in the server and entity totals, as they are handled by the messaging environment, but they are not attributed to any mailbox or department as a sent message.

Additionally, the aforementioned differences in the total number of messages sent and received across all departments or all users and the entire entity may be because, for example, a single instance of a message is stored by a server although the message is directed to a plurality of recipients having mailboxes on that server. Accordingly, a single message may be counted for that server whereas a separate count for a received message may be made with respect to each such user. Such counts are preferably made to keep an accurate reflection of the activity of each user.

Preferably, data computation/analyzer 530 counts unique message IDs having one of a plurality of event codes to derive the number of sent and received message totals. For example, event code "4" indicating local message submission may be interpreted as "sent"; event code "9" indicating delivery to local recipients may be interpreted as "received"; event code "1000" indicating local delivery (sender and recipient both are local) may be interpreted as both "sent" and "received"; event codes "1013", and "1019" indicating SMTP submits message for delivery may be interpreted as "sent" when associated with an SMTP client; event code "1027" indicating MAPI submits message for delivery may be interpreted as "sent" when associated with an MAPI client; and event code "1028" indicating SMTP local delivery may be interpreted as "received". Accordingly, each unique message ID within the "sent" event codes (4, 1000, 1013, 1019, and 1027) preferably counts as a single message sent and each unique message ID with the "received" event codes (9, 1000, and 1028) preferably counts as one message received for deriving totals with respect to sent and received messages.

Although the sent and received message determinations may be made according to a preferred embodiment based on event codes as discussed above, determinations with respect to internal and external messages preferably includes examination of the recipients of the message to provide accurate interpretations. Preferably, sent messages are considered "sent/internal" if they are sent to an internal recipient, and "sent/external" if there are external recipients. "Sent/both" is preferably the total of all sent messages. Received messages are preferably considered "received/internal" if they are received from another internal user, and "received/external" if they came from an external user. "Received/both" is preferably the total of all received messages. A recipient is may be considered to be internal if the user has an proprietary mail server designation, such as the "Exchange Distinguished Name" utilized by EXCHANGE servers, and external if it is an "SMTP address."

It should be appreciated that some servers may utilize SMTP addresses to reference users whether internal or external thereto. Accordingly, embodiments of the invention may compare the domain suffix of the user (e.g., "@mycompany.com") to a list of known local domains for the messaging environment. If the comparison of such a domain suffix is a match, the user may be considered internal. This embodiment provides an additional benefit in that message environments with multiple messaging platforms (e.g., EXCHANGE and LOTUS NOTES) may wish to consider messages internal when they traverse these messaging platforms. The aforementioned comparison of domain suffixes allows configurations in which each such messaging platform is recognized as a local domain for message counting purposes.

It should be appreciated that a single "sent" message may be counted in the "internal" and "external" totals if it includes both types of recipients. However, according to the preferred embodiment such a message will only count as one sent message when "both" is selected. Accordingly, the sum of internal sent messages and external sent messages may be greater than the total number of sent messages.

A single "received" message preferably counts as internal if it came from an internal sender, and external if it came from an external sender. Since a message has only one sender, the sum of received/internal messages and received/external message should always be equal to the total number of received messages according to the preferred embodiment.

According to the preferred embodiment, messages are credited to mailboxes in a way similar to crediting messages to servers, as discussed above. However, the server logs are preferably effectively combined into a single view of entity-wide message traffic, so messages that cross several boundaries will not be double-counted as they are for servers. For example, a user who sends a single message to himself, 2 mailboxes on a different server, and 2 external addresses will preferably be credited for 1 (sent/both), 1 (sent/internal), 1 (sent/external), and 1 (received/internal).

Mailbox message counting is preferably based on the message ID. Accordingly, even if a mailbox receives several copies of the same message, it will only be counted as a single received message, because the copies will all have the same message ID.

The tracking log events counted according to the preferred embodiment data computation/analyzer 530 generally provide information with respect to messages after a message server has expanded any distribution lists. Accordingly, a message sent to a distribution list counts as a received message for all mailboxes on that distribution list according to a preferred embodiment.

Attachment count and attachment size information is preferably based on Internet Mail Connector (IMC) archives. The IMC archives contain a copy of every message that passes through the IMC. Accordingly, a preferred embodiment transform of the present invention may parse these multi-part MIME messages and collect the metadata relating to attachment number, size, and type.

It should be appreciated that the IMC archives typically only contain logs of messages that pass through the IMC. Generally, a message passes through the IMC only if it has an external sender or at least one external recipient. Therefore, attachment information according to a preferred embodiment is available only in association with external messages. Alternative embodiments may utilize archives associated with internal messages to provide attachment information with respect thereto, if desired.

Mail clients generally do not reliably set the MIME type of an attached file. Therefore, attachment type is preferably determined using other information indicative of type. For example, embodiments of the present invention may look to the extension on the filename of an attachment for a determination of attachment type. It should be appreciated that misnaming of a file extension, such as a user renaming an MP3 file to have a DOC extension, may result in erroneous attachment type counts using the aforementioned technique. Accordingly, embodiments of the present invention may additionally or alternatively analyze the content of the attached file for a determination of the attachment type. However, such an embodiment utilizes considerable resources in making such determinations. Moreover, it is not expected that the number of misnamed files will be statistically significant in most messaging environments. Accordingly, preferred embodiments forego analysis of file contents in making attachment type determinations. However, preferred embodiments of the present invention do provide some simple processing with respect to the attachment to facilitate optimized operation. For example, preferred embodiments may process attachment extensions, such as to convert all such attachment extensions to uppercase, to truncate the extensions to a predetermined number of characters, and/or to normalize well-known file extensions, such as by mapping both HTML and HTM to HTM, and mapping JPEG and JPG to JPG.

The number of attachments and the sizes thereof are preferably gathered from multi-part MIME messages according to the present invention. However, a maximum message size is preferably established for parsing number of attachments and/or sizes for performance reasons. For example, according to a preferred embodiment the largest message a transform of the present invention will attempt to parse for such information 100 MB. If a single message is more than 100 MB, according to this embodiment, data about its attachments will not appear in the interpreted information. However, even in such a situation, the preferred embodiment provides information with respect to the total message size, without detail of how many attachments and their sizes comprise the total message, because such information may be available independently, such as within the aforementioned tracking logs.

Once this data is interpreted by data computation/analyzer 530 of the preferred embodiment, the resulting information is preferably inserted into data warehouse 104 (step 404 of FIG. 4). It should be appreciated that although data warehouse 104 of the preferred embodiment provides database storage of information derived according to the present invention, transforms 500 of the preferred embodiment continues to have access thereto for further processing as described herein. Accordingly, data warehouse 104 is illustrated within transforms 500 of the preferred embodiment although data warehouse 104 may be provided as a database external thereto.

Insertion of information into data warehouse 104, such as into active database 541 may be controlled by transforms 500 of the preferred embodiment to provide information updating etcetera. A preferred embodiment of the present invention preferably aggregates data over time (step 405 of FIG. 4), such as by creating, updating, combining, and/or deleting appropriate data components, e.g., one or more of warehouse data components 541-1 through 541-3, using information provided by data computation/analyzer 530.

Additionally or alternatively, transforms 500 of the preferred embodiment may manipulate information, or portions thereof, stored in data warehouse 104 even in the absence of inserting information provided by data computation/analyzer 530. In order to provide desired aggregated results, such as message data aggregated over various periods of time, transforms 500 may continually, occasionally, and/or periodically manipulate information stored in data warehouse 104. For example, information from data computation/analyzer 530 may be with respect to how many messages were handled by a particular server for one particular hour of the day. This information may be useful in this level of detail for a limited period of time. Accordingly, transforms 500 may periodically manipulate this data, preferably upon its reaching a predetermined obsolescence time, and add up all the hours in a day to get a daily rollup of such information. Similarly, daily rollup information may periodically be added up to provide a weekly, monthly or quarterly rollup.

The more granular data used in such rollups is preferably deleted or marked for deletion once the appropriate aggregated data has been formed in order to optimize the use of storage resources. Additionally or alternatively, this information may be removed from the active database while still being available for historical analysis and other purposes. For example, rather than being deleted entirely, particular data components of active database 541 may be periodically transferred to archive 542 (step 406 of FIG. 4), if desired.

Preferably, transforms of the present invention are adapted to accommodate the introduction of late data. For example, a probe of the present invention may be prevented from running and/or reporting as scheduled and, therefore, data collected from associated data sources may be delivered to the management server system later than expected. Accordingly, systems of the preferred embodiment transforms recognize this late data and process it accordingly. For example, correlator/parser 520 may recognize data as late data, such as by time information associated therewith, based upon a context of the data, from a relationship with other data, from an indication provided by an associated data collector, and/or the like, and cause transforms 500 to manipulate this data in a special manner. According to one embodiment, correlator/parser 520 stores such late data in a particular portion of messaging data 521. This data may be processed or analyzed by computation/analyzer 530 to supplement previous computations of the appropriate time and/or to avoid erroneously affecting computations based upon more recent data. Similarly, this data may be utilized by transforms 500 to revise the roll-ups or other aggregated data of data warehouse 104.

It should be appreciated that embodiments of transforms of the present invention, such as transforms 500 described above, may apply different rules to different data, e.g., in a service bureau implementation different rules may be applied to messaging data of different entities. Accordingly, in operation according to a preferred embodiment at any given time the systems of the transforms know which rules or counting standards are to be applied to all portions of the collected data, such as what entity the data is associated with and what counting standard is to be applied.

Another aspect of the preferred embodiment transforms which may be configured according to the present invention is the timing of the transforms. For example, in particular scenarios it may be desirable to collect messaging data throughout the day and apply transforms of the present invention to collected data once during the night. In such a situation useful information with respect to the messaging environment monitored/managed may be available early the following day. Additionally or alternatively, transforms of the present invention may be operated upon a different, perhaps more or less frequent, schedule. For example, transforms may be run periodically throughout the day to provide useful information more contemporaneously with events. Preferably, the timing and frequency of operation of transforms of the present invention is selectable to accommodate different entity's and individual's desired schedule.

It should be appreciated that transforms of the present invention need not await operation according to a predetermined schedule. Accordingly, a preferred embodiment of the present invention allows for selectively triggering operation of transforms. For example, a message system manager may utilize an access terminal to interface with a management server system of the present invention, such as using a web browser as is well known in the art, and initiate operation of transforms of the present invention.

As described above, data as manipulated by transforms 500 of the preferred embodiment is preferably stored in data warehouse 104. However, data warehouse 104 preferably stores several types of data. For example, data warehouse 104 may store aspects of the collected data and/or conclusions made therefrom. Moreover, a preferred embodiment of data warehouse 104 stores information with respect to user sessions and tracks logins and authentication's for users of the management server system. Similarly, when users create and save reports, when they configure monitors, selected alerts, alarms and thresholds, values to monitor, etcetera, are all preferably stored in data warehouse 104. Additionally, data warehouse 104 of the preferred embodiment stores information with respect audit events, logs, errors, history and usage of the distributed management system useful in the management and operation thereof. Accordingly, not only may information with respect to the monitoring/management of the messaging environments be mined from data warehouse 104, but so too may information with respect to the operation of the systems of the present invention.

Data stored within data warehouse 104 is preferably accessible to systems of reporter farm 105. Accordingly, reporter farm may be utilized to present the information in desired formats. For example, an information technology manager responsible for messaging environment 110 may access a system of reporter farm 105, such as remotely using operator terminal 15-1 coupled thereto via network 120. Of course systems other than operator terminal 15-1 may be utilized in querying and/or receiving information from management server system 140, if desired. For example, any system coupled to network 120 may be enabled to communicate with management server system 140 for receipt of information.

According to a preferred embodiment, platform independent applications, such as a web browser, may be utilized in generating, retrieving, and/or viewing information from systems of reporter farm 105. Accordingly, systems of reporter farm 105 may execute software that facilitates retrieval of information from data warehouse 104 for presentation in meaningful ways. Such software may intelligently guide users through the process of gaining that information.

It should be appreciated that it is generally difficult for messaging environment administrators to manage a backend database warehouse system needed for monitoring/managing a relatively large messaging environment. For example, the hardware to provide the necessary infrastructure is typically expensive and tangential to the business mission. Moreover, the complexity of the setup and configuration of a database management system, the need for a database administrator to perform routine tasks, such as backups and purging, all result in inadequate monitoring/management of such systems or the failure to event attempt such a task. Accordingly, implementing a centralized data warehouse, such as may be shared across multiple environments and/or environments of multiple entities, and such as may be provided in a service bureau arrangement, results in a desirable solution to a important need providing economies of scale by supporting all the collected data out of a centralized database, rather than each messaging environment having to have their own database.

Moreover, such a centralized configuration provides the ability to provide functionality not otherwise available, such as the ability to compare and contrast data between different messaging environments. For instance, the present invention may be utilized to compare a certain entity's messaging environment against the aggregates of other entities' messaging environments so they know how they compare to their peers.

A preferred embodiment of reporter farm 105 includes at least two applications operable thereon. A first such application provides messaging information (MI), allowing users to access the information in the reports, as well as to create monitors, among other things. A second such application provides an operations support tool (OST) used to manage the system itself, as well as to create configurations, create users for the MI application, etcetera.

The preferred embodiment MI application is the end user application and, therefore, is typically how a user experiences the system. Preferably, where the management server system is operable with respect to a plurality of messaging environments, there is single MI application, providing unique logins and security to protect information as between different entities etcetera. Accordingly, each user may utilize an individual login, have a particular "home page" associated therewith, and be provided access to particular historical reports or information. Particular users may be enabled to view monitored values as well as configure what parameters are being monitored, which message servers are being monitored, etcetera. Accordingly, using the preferred embodiment MI application users may configure, edit, add, and/or delete monitors, where monitors are high level objects utilized provide user interfacing with respect to underlying implementation technology, such as the above described probes and scheduler. Similarly, users may configure, generate, and/or save reports and report formats, perhaps even providing for the export of data into external systems such as spreadsheet applications for further analysis.

The MI application preferably provides a picture of the entire messaging environment, including the topology, to provide users with insight into how traffic flows throughout the messaging environment how resources are grouped. Accordingly, the MI application is where the messaging environment information all comes together and where the user gets the information they need to make decisions and take actions.

The preferred embodiment OST application provides a tool primarily utilized by those tasked with the operation, support, and maintenance of the distributed management system itself. Using the preferred embodiment OST application, users may fully configure data collectors of the present invention, such as to define a particular data collector, establish that it probes particular servers, turn on and off the operation of data collectors or aspects thereof, as well as to perform diagnostics of data collectors. Additionally or alternatively, an OST application of the preferred embodiment allows a user, preferably by messaging via the data collectors, to manage the servers that the data collectors probe, manage specific information about those servers, and even run diagnostics on the message servers. A preferred embodiment OST application may provide additional remote management aspects, such as to poll data collectors to determine what functions have been performed within a particular period of time, such as the last hour, week, or month. Accordingly, the preferred embodiment OST application provides a tool by which many aspects of the distributed management system may be controlled and from which insight into the operation of the distributed management system may be had.

According to the preferred embodiment, the systems of collector farm 101 and reporter farm 105 cooperate to provide aspects of the above described functionality. For example, all communication with the data collectors deployed in a messaging environment is preferably provided by systems of collector farm 101. Accordingly, messages from a system of reporter farm 105 destined for a particular data collector will preferably pass through a system of collector farm 101. Similarly, a message from a data collector for a system of reporter farm 105 will preferably be communicated through a system of collector farm 101. This preferred embodiment facilitates the use of the aforementioned one-way implementation of communication links while still providing for desired communications.

Additionally, according to the preferred embodiment, the systems of reporter farm 105 and the data collectors cooperate to provide aspects of the above described functionality. For example, a system of reporter farm 105 may send diagnostic messages to one or more data collectors to determine the status of a message server, to determine if the software on the data collector is running, etcetera. Similarly, the systems of reporter farm 105 may provide messaging to allow remote browsing of data collector file systems to see exactly what processes are running on the data collector itself, to provide updating of the data collector's software, to communicate new configuration information, etcetera.

Likewise, according to the preferred embodiment, the systems of collector farm 101 and the data collectors cooperate to provide aspects of the above described functionality. For example, data collectors preferably establish communication links with systems of collector farm 101 to provide data communication between the management server system and the data collectors and/or systems of the messaging environment.

Figure 3:
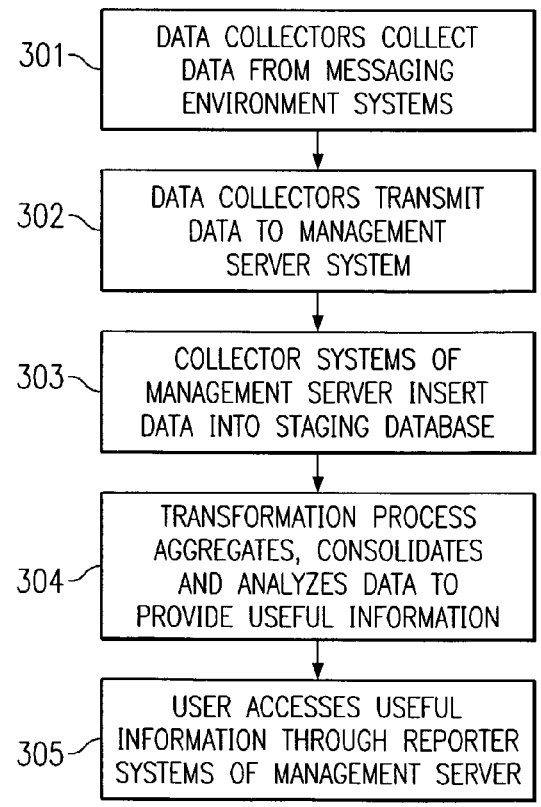
FIG. 3 shows a flow diagram of data collection and reporting according to a preferred embodiment of the present invention.

Directing attention to FIG. 3, a flow diagram of collecting and reporting of message environment information according to a preferred embodiment is shown. At step 301, data collectors preferably collect data from messaging environment systems. At step 302 the data collectors preferably transmit data to a corresponding management server system. At step 303 collector systems of the management server insert data received from the data collectors into a staging database. At step 304 a transformation process operates upon the data of the staging database to aggregate, consolidate, and analyze the data to provide "useful" information. At step 305, a user accesses the "useful" information via reporter systems of the management server.

Having described the operation of the illustrated embodiment of a distributed management system of the present invention, preferred embodiment deployment configurations will be described to allow the reader to better appreciate aspects of the present invention. The preferred embodiment distributed management system includes data collectors deployed remotely from a management server to facilitate data collection. For example, the level of access to the data sources of the messaging environment typically required for providing desired monitoring and/or management functionality is one which in practice security administrators of the messaging environments may be reluctant to grant. However, the preferred embodiment data collectors are deployed within the messaging environment to provide a proxy having a high level of access to the servers in order to collect the data, but with the level of external access greatly reduced or diminished.

Use of the preferred embodiment data collectors further facilitates the use of particular ports that would not be available an external probing configuration. For example, data collectors of the present invention may utilize netbios ports that would not be accessible to systems deployed upon the outside of a messaging environment firewall.

Additionally, the preferred embodiment data collectors facilitate the use of particular protocols that would not be available with an external probing configuration. For example, data collectors of the present invention may utilize netbios protocols to collect data that are typically not available for external communication.

The origination nature of the connection utilized according to preferred embodiments of the present invention is not available with an external probing configuration. Specifically the ability to initiate communication with the servers and have the desired level of access thereto would typically not be possible from outside of the message environment firewall without significant reconfiguration and/or creating serious security issues. Moreover, the preferred embodiment provides for only external links which are initiated from within the messaging environment, resulting in a system which substantially does not introduce security issues.

Additionally, the preferred embodiment data collector configuration is adapted to work well with bandwidth constraints. By collecting the data locally in the messaging environment, and then preferably processing or reducing that data down to the valuable information or conclusions, consumption of bandwidth may be minimized. Moreover, the independent processor based systems of the preferred embodiment data collectors allow for collection of data from systems of the messaging environment with minimal impact upon the operation thereof.

Another feature of the preferred embodiment data collector configuration is that data collectors of the present invention may be utilized as a part of an alerting mechanism. For example, when monitored values are out of range or out of tolerance, one or more of the data collectors may operate to provide communication of alarms or alerts to the appropriate personnel. Providing alerts from the data collectors within the messaging environment may be advantageous where latency is an issue with respect to communications between the messaging environment and the management server system or where the communication links have failed or are otherwise unreliable. Of course, such alarms or alerts may be provided from the management server system of the present invention in addition to or in the alternative to providing alarms or alerts from the data collectors, if desired. Such a configuration diminishes the chance that an alert will not reach the appropriate person.

Although the present invention and its advantages have been described in detail, it should be understood that various changes, substitutions and alterations can be made herein without departing from the spirit and scope of the invention as defined by the appended claims. Moreover, the scope of the present application is not intended to be limited to the particular embodiments of the process, machine, manufacture, composition of matter, means, methods and steps described in the specification. As one of ordinary skill in the art will readily appreciate from the disclosure of the present invention, processes, machines, manufacture, compositions of matter, means, methods, or steps, presently existing or later to be developed that perform substantially the same function or achieve substantially the same result as the corresponding embodiments described herein may be utilized according to the present invention. Accordingly, the appended claims are intended to include within their scope such processes, machines, manufacture, compositions of matter, means, methods, or steps.

What is claimed is:

1. A method for processing messaging data, said method comprising:
    collecting, by a data collector system, message server message environment metrics from a plurality of message servers;
    processing, by said data collector system, said message environment metrics provided from different ones of said message servers to provide data useful in deriving desired messaging statistics; and
    outputting, by said data collector system, said data useful in deriving desired messaging statistics to a data transform system for aggregation with data from a plurality of data collector systems to derive said desired messaging statistics.

2. The method of claim 1, further comprising:
    deriving, by said data transform system, said desired messaging statistics using data from said plurality of data collector systems and predefined analysis rules.

3. The method of claim 2, further comprising:
    generating a report including said desired messaging statistics.

4. The method of claim 2, further comprising:
    automatically instigating said deriving according to a predetermined schedule.

5. The method of claim 2, further comprising:
    instigating said deriving upon initiation by an operator.

6. The method of claim 2, wherein said deriving comprises:
    enforcing counts with respect to operation of particular attributes of a messaging environment in accordance with said predefined analysis rules.

7. The method of claim 2, further comprising:
    configuring, by an operator, said predefined analysis rules.

8. The method of claim 2, wherein said predefined analysis rules include a first rule for application with respect to data associated with a first entity and a second rule for application with respect to data associated with a second entity.

9. The method of claim 2, wherein said predefined analysis rules include a first rule for application with respect to data associated with a first organization of an entity and a second rule for application with respect to data associated with a second organization of said entity.

10. The method of claim 1, further comprising:
    aggregating, by said data transform system, said desired messaging statistics.

11. The method of claim 10, wherein said aggregating includes rolling up information to provide statistical information having less detail.

12. The method of claim 1, further comprising:
    storing, by said data collector system, at least a portion of said data useful in deriving desired messaging statistics in a data store for said deriving said desired messaging statistics.

13. The method of claim 1, wherein said message environment metrics include data components provided from different ones of said message servers having a same information content, and wherein said processing comprises identifying said data components having said same information content.

14. The method of claim 1, wherein said message environment metrics includes data components provided from a same one of said message servers having a same information content, and wherein said processing comprises identifying said data components having said same information content.

15. The method of claim 1, wherein said processing utilizes identifiers associated with data components of said message environment metrics selected from the group consisting of time information associated with said data components, a server identity associated with said data components, a mailbox identity associated with said data components, and a message ID associated with said data components.

16. The method of claim 15, wherein said processing utilizes a combination of two said identifiers to correlate different data components of said message environment metrics.

17. The method of claim 1, wherein message servers of said plurality of message servers are associated with different entities.

18. The method of claim 1, wherein message servers of said plurality of message servers provide different messaging services.

19. The method of claim 1, wherein said plurality of message servers include mail servers and wireless servers.

20. The method of claim 1, further comprising:
identifying late data for special processing.

21. A system for processing messaging data, said system comprising:
a processor based system operable, at least in part, to provide a data collector collecting raw data from a plurality of different messaging servers, correlating data components of said collected data provided from different ones of said messaging servers to parse said data, and storing at least a portion of said parsed data in a parsed data store; and
a processor based system operable, at least in part, to provide a data analyzer accessing said data store, utilizing predefined analysis rules to provide statistical information from data of said data store, and storing at least a portion of said statistical information in a data warehouse.

22. The system of claim 21, wherein said processor based data collector comprises:
a data collection system providing initial collection of said raw data, wherein said data collection system includes at least one probe for interfacing with at least one messaging server of said messaging servers for collection of said raw data; and
a data collection server in communication with said data collection system, wherein said data collection system is disposed remotely with respect to said data collection server.

23. The system of claim 22, wherein said correlating data components of said collected data provided from different ones of said messaging servers and said storing at least a portion of said parsed data in a parsed data store is provided by said data collection server.

24. The system of claim 23, wherein said data collection system operates to filter said raw data prior to passing data to said data collection server.

25. The system of claim 23, wherein said data collection system operates to pass said raw data to said data collection server.

26. The system of claim 21, wherein said raw data is data which has not been further processed after collection from said plurality of different messaging servers.

27. The system of claim 21, wherein said raw data includes data components provided from different ones of said data sources having a same information content.

28. The system of claim 27, wherein correlation by said processor based system data collector identifies said data components having said same information content and stores one said data component in said data store.

29. The system of claim 21, wherein said raw data includes data components provided from a same one of said data sources having a same information content.

30. The system of claim 29, wherein correlation by said processor based system data collector identifies said data components having said same information content and stores one said data component in said data store.

31. The system of claim 21, wherein correlation by said processor based system data collector utilizes identifiers associated with data components of said raw data.

32. The system of claim 31, wherein said identifiers include time information associated with said data components.

33. The system of claim 32, wherein said processor based system data collector utilizes a selected window of time for said correlation.

34. The system of claim 33, wherein said selected window of time is user selectable.

35. The system of claim 31, wherein said identifiers include a server identity associated with said data components.

36. The system of claim 31, wherein said identifiers include a mailbox identity associated with said data components.

37. The system of claim 36, wherein said processor based system data collector utilizes a canonical reference to a mailbox for said correlation.

38. The system of claim 31, wherein said identifiers include a message ID associated with said data components.

39. The system of claim 31, wherein correlation by said processor based system data collector utilizes a combination of two said identifiers associated with data components of said raw data.

40. The system of claim 21, wherein said messaging servers include messaging servers of multiple messaging environments.

41. The system of claim 40, wherein said multiple messaging environments are associated with different entities.

42. The system of claim 41, wherein said system is deployed in a service bureau configuration.

43. The system of claim 21, wherein said messaging servers include servers providing different messaging services.

44. The system of claim 21, wherein said messaging servers include mail servers and wireless servers.

45. The system of claim 21, wherein said processor based system data collector is further adapted to identify late data for special processing by said process based system data analyzer.

46. The system of claim 21, wherein operation of said processor based system data collector is provided continuously as data is accepted and operation of said processor based system data analyzer is provided periodically.

47. The system of claim 21, wherein said predefined analysis rules enforce counts with respect to operation of particular attributes of a messaging environment.

48. The system of claim 21, wherein said predefined analysis rules include different rules for enforcement with respect to particular data.

49. The system of claim 48, wherein said different rules include a first set of rules for application with respect to data associated with a first entity and a second set of rules for application with respect to data associated with a second entity.

50. The system of claim 48, wherein said different rules include a first set of rules for application with respect to data associated with a first organization of an entity and a second set of rules for application with respect to data associated with a second organization of said entity.

51. The system of claim 21, wherein said processor based system data analyzer is further adapted to aggregate statistical information stored in said data warehouse.

52. The system of claim 51, wherein said aggregation includes rolling up information to provide statistical information having less detail.

53. The system of claim 51, wherein said processor based system data analyzer is further adapted to identify late data and to adjust aggregated statistical information stored in said data warehouse accordingly.

* * * * *